US010716036B2

(12) United States Patent
Singh et al.

(10) Patent No.: US 10,716,036 B2
(45) Date of Patent: Jul. 14, 2020

(54) TRANSMISSION OF SIGNALING INDICATION FOR INTRA-UE PUNCTURED UPLINK TRANSMISSIONS

(71) Applicant: Nokia Technologies Oy, Espoo (FI)

(72) Inventors: Bikramjit Singh, Espoo (FI); Mikko A Uusitalo, Helsinki (FI); Frank Frederiksen, Klarup (DK); Daniela Laselva, Klarup (DK); Klaus Pedersen, Aalborg (DK); Zexian Li, Espoo (FI); Ling Yu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/932,253

(22) Filed: Feb. 16, 2018

(65) Prior Publication Data

US 2019/0261229 A1 Aug. 22, 2019

(51) Int. Cl.
| H04W 56/00 | (2009.01) |
| H04W 36/00 | (2009.01) |
| H04W 36/02 | (2009.01) |
| H04W 36/16 | (2009.01) |
| H04W 36/20 | (2009.01) |
| H04L 5/00 | (2006.01) |

(52) U.S. Cl.
CPC ....... *H04W 36/0044* (2013.01); *H04L 5/0044* (2013.01); *H04L 5/0096* (2013.01); *H04W 36/0072* (2013.01); *H04W 36/023* (2013.01); *H04W 36/165* (2013.01); *H04W 36/20* (2013.01); *H04L 5/0007* (2013.01)

(58) Field of Classification Search
CPC ......... H04W 36/0044; H04W 36/0072; H04W 36/023; H04W 36/165; H04W 36/20

USPC ........................................................ 370/331
See application file for complete search history.

(56) References Cited

U.S. PATENT DOCUMENTS

| 2011/0274081 | A1* | 11/2011 | Chun | H04L 5/0007 |
| | | | | 370/330 |
| 2014/0105191 | A1* | 4/2014 | Yang | H04L 1/1867 |
| | | | | 370/336 |
| 2018/0110031 | A1* | 4/2018 | Yoshizawa | H04W 76/10 |
| 2018/0279291 | A1* | 9/2018 | Tiirola | H04L 1/1861 |
| 2018/0317241 | A1* | 11/2018 | Xia | H04W 72/042 |

OTHER PUBLICATIONS

Samsung, Impact on eMBB PDSCH BLER by eMBB puncturing to support URLLC, R1-1609060, 3GPP TSG-RAN WG1#86bis, Oct. 2016.
Huawei, HiSilicon, "Handling collision between sTTI and 1ms TTI", R1-1608640, 3GPP TSG-RAN WG1#86bis, Oct. 2016.
Huawei, HiSilicon, "Discussion on UL multiplexing of grant-based eMBB and URLLC", R1-1708125, 3GPP TSG-RAN WG1#89, May 2017.
Huawei, HiSilicon, "Discussion on UL multiplexing of URLLC and eMBB", R1-1800057, 3GPP TSG-RAN WG1 Ad Hoc, Jan. 2018.
(Continued)

*Primary Examiner* — Sai Ming Chan
(74) *Attorney, Agent, or Firm* — Harrington & Smith (57) ABSTRACT

A method is provided including configuring, by a network node, a set of resources to be used by at least one user equipment for transmitting a first type of uplink data; receiving from the at least one user equipment information that indicates that at least one resource in the set of resources comprises a second type of uplink data different than the first type of uplink data; and decoding data received on the at least one resource based on the information.

20 Claims, 6 Drawing Sheets

(56) References Cited

OTHER PUBLICATIONS

Sony, "On eMBB/URLLC multiplexing for Uplink", R1-1708257, 3GPP TSG-RAN WG1#89, May 2017.
Ericsson, "On intra-UE UL puncturing", R1-1709113, 3GPP TSG-RAN WG1#89, May 2017.

* cited by examiner

— TRANSMISSION OF SIGNALING INDICATION FOR INTRA-UE PUNCTURED UPLINK TRANSMISSIONS

TECHNICAL FIELD

Various example embodiments relate generally to wireless networks and, more specifically, relate to ultra-reliable and low-latency communications.

BACKGROUND

Future wireless networks (such as $5^{th}$ Generation (5G) wireless networks for example), are currently being designed to handle multiple use cases that go beyond mobile broadband (MBB) service. The multiple use cases in 5G wireless networks include, for example, enhanced mobile broadband (eMBB) and ultra-reliable and low latency communications (URLLC). Typically, eMBB traffic tends to be more sustained while URLLC traffic tends to be more sporadic and unpredictable. In this way, eMBB traffic has one set of unique requirements, whereas and URLLC traffic has another set of unique requirements as URLLC traffic should satisfy two conflicting requirements: low latency and ultra-high reliability.

Abbreviations that may be found in the specification and/or the drawing figures are defined below, after the main part of the detailed description section.

BRIEF SUMMARY

This section is intended to include examples and is not intended to be limiting.

In accordance with one example, a method may include configuring, by a network node, a set of resources to be used by at least one user equipment for transmitting a first type of uplink data; receiving from the at least one user equipment information that indicates that at least one resource in the set of resources comprises a second type of uplink data different than the first type of uplink data; and decoding data received on the at least one resource based on the information.

In accordance with another example, an apparatus may include means for performing: configuring, by a network node, a set of resources to be used by at least one user equipment for transmitting a first type of uplink data; receiving from the at least one user equipment information that indicates that at least one resource in the set of resources comprises a second type of uplink data different than the first type of uplink data; and decoding data received on the at least one resource based on the information.

In accordance with another example, computer readable medium may include program instructions stored thereon for causing an apparatus to perform at least the following: configuring, by a network node, a set of resources to be used by at least one user equipment for transmitting a first type of uplink data; receiving from the at least one user equipment information that indicates that at least one resource in the set of resources comprises a second type of uplink data different than the first type of uplink data; and decoding data received on the at least one resource based on the information.

In accordance with another example, a method includes receiving, from a network node, an uplink resource grant comprising a set of resources to be used by a user equipment for transmitting a first type of uplink data; determining, by the user equipment, a need to transmit a second type of uplink data different than the first type of uplink data, and transmitting by the at least one user equipment: information indicating that at least one resource in the set of resources comprises a second type of uplink data different than the first type of uplink data, and the second type of uplink data using the at least one resource.

In accordance with another example, an apparatus may include means for performing: receiving, from a network node, an uplink resource grant comprising a set of resources to be used by a user equipment for transmitting a first type of uplink data; determining, by the user equipment, a need to transmit a second type of uplink data different than the first type of uplink data, and transmitting by the at least one user equipment: information indicating that at least one resource in the set of resources comprises a second type of uplink data different than the first type of uplink data, and the second type of uplink data using the at least one resource.

In accordance with another example, computer readable medium may include program instructions stored thereon for causing an apparatus to perform at least the following: receiving, from a network node, an uplink resource grant comprising a set of resources to be used by a user equipment for transmitting a first type of uplink data; determining, by the user equipment, a need to transmit a second type of uplink data different than the first type of uplink data, and transmitting by the at least one user equipment: information indicating that at least one resource in the set of resources comprises a second type of uplink data different than the first type of uplink data, and the second type of uplink data using the at least one resource.

BRIEF DESCRIPTION OF THE DRAWINGS

Some example embodiments will now be described with reference to the accompanying drawings.

DETAILED DESCRIPTION

Features as described herein occasionally refer to LTE terms, however, it is noted that these features may be used in the future with other types of systems (such as New Radio (NR)/5G wireless systems for example). These other wireless systems may be defined by a relevant wireless standard, such as is the case of NR/5G systems for example. In this way, references to, for example, an eNB (i.e. an LTE base station) are equally applicable to future base stations of these other wireless networks (such as, for example, base stations in 5G wireless networks referred to as gNB) unless indicated otherwise.

Various exemplary embodiments herein describe techniques for transmission of URLLC a signaling indication for intra-UE punctured uplink transmissions. Additional description of these techniques is presented after a system into which the exemplary embodiments may be used is described.

Figure 1:
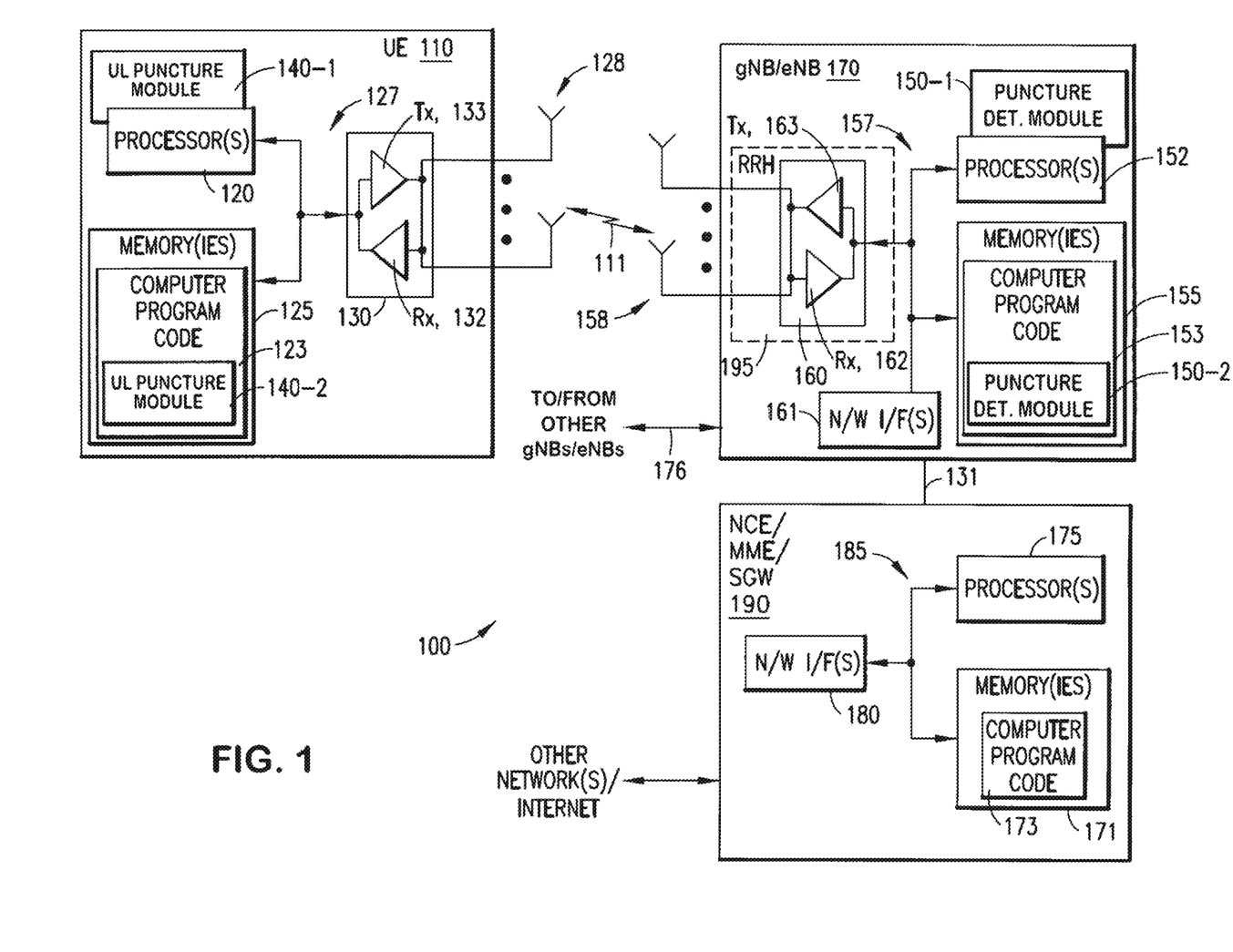
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes an uplink (UL) puncture module, comprising one of or both parts 140-1 and/or 140-2, which may be implemented in a number of ways. The uplink puncture module may be implemented in hardware as uplink puncture module 140-1, such as being implemented as part of the one or more processors 120. The uplink puncture module 140-1 may be implemented also as an integrated circuit or through other hardware such as a programmable gate array. In another example, the uplink puncture module may be implemented as uplink puncture module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with gNB/eNB 170 via a wireless link 111.

The gNB/eNB (5$^{th}$ generation Node B/evolved NodeB) 170 is a base station (for example, for 5G/LTE) that provides access by wireless devices such as the UE 110 to the wireless network 100. The gNB/eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB/eNB 170 includes a puncture determination (det.) module, comprising one of or both parts 150-1 and/or 150-2, which may be implemented in a number of ways. The puncture determination module may be implemented in hardware as puncture determination module 150-1, such as being implemented as part of the one or more processors 152. The puncture determination module 150-1 may be implemented also as an integrated circuit or through other hardware such as a programmable gate array. In another example, the puncture determination module may be implemented as puncture determination module 150-2, which is implemented as computer program code 153 and is executed by the one or more processors 152. For instance, the one or more memories 155 and the computer program code 153 are configured to, with the one or more processors 152, cause the gNB/eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB/eNB 170 being physically in a different location from the RRH, and the one or more buses 157 could be implemented in part as fiber optic cable to connect the other elements of the gNB/eNB 170 to the RRH 195.

It is noted that description herein indicates that "cells" perform functions, but it should be clear that the eNB that forms the cell will perform the functions. The cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of 6 cells.

The wireless network 100 may include one or more network control elements (NCE) 190 that may include MME (Mobility Management Entity) and/or SGW (Serving Gateway) functionality, and which provides connectivity with a further network, such as a telephone network and/or a data communications network (e.g., the Internet). The gNB/eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB/eNB 170, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the various exemplary embodiments, the exemplary embodiments will now be described with greater specificity.

It should be noted that the term 'USI' as used herein is just an example and should not be seen as limiting. For example, the term 'USI' as used herein may generally refer to a signal used to indicated that 'special actions' have occurred on the transmitter side. For example, the 'special actions' as discussed below with some example embodiments relate to puncturing of one data set to allow for another set of data to have priority.

Ultra-reliable and low-latency communications (URLLC) is one important enabler to support new services being offered by future wireless networks (such as 5G wireless networks for example). URLLC transmissions require very high reliability and low latency. For example, one of the most stringent requirements on URLLC currently being studied by 3GPP is 99.999% reliability under the radio latency bound of 1 ms. For a small packet, the maximum packet error rate must not be higher than $10^{-5}$, where maximum allowable radio latency, including potential retransmissions is down to 1 ms. With the new numerology consideration for 5G, for example shorter TTI size or even shorter mini-slot concept and each TTI contains both control and data information, there is a possibility to support Uplink (UL) transmissions (contention-based or scheduling based) with 1 ms latency. It is noted that a mini-slot may be considered a short version of slot. For example a slot can be defined with the length of 7 OFDM symbols, and a mini-slot can be defined with a length of 2 OFDM symbols. The length of a mini-slot may be configurable and the value may be from 1 to (slot length−1) OFDM symbols.

For sporadic URLLC UL transmissions, grant-based access (i.e. dynamic scheduling) may not be the ideal scheme due to additional latency and signaling overhead resulting from the scheduling procedure. Instead it is expected that grant-free access may be used rather than grant-based. However, grant-free access suffers occasionally from additional latency if collision occurs. Therefore, one promising solution to serve URLLC UL traffic in a timely manner is the puncturing of an ongoing eMBB transmission.

Figure 2:
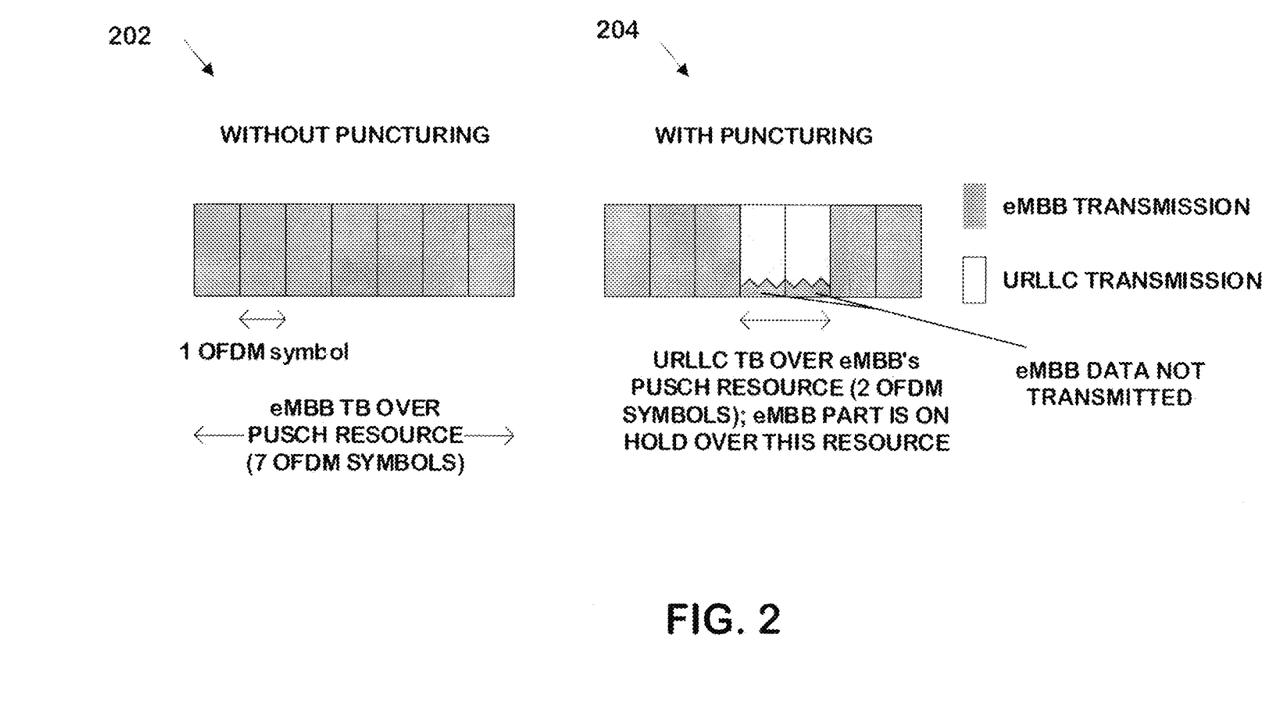
FIG. 2 shows an intra-user equipment puncturing process in accordance with some example embodiments.

Referring now to FIG. 2, this figure shows an intra-user equipment puncturing process in accordance with some example embodiments. In FIG. 2, a user equipment may receive a UL resource grant for e.g. PUSCH for an eMBB transmission with a given transport block (TB). In this example, the UL resource grant is 7 OFDM symbols and is initially allocated for the eMBB transmission as shown in 202. At 204, the UE can puncture the eMBB resources with a URLLC TB having a relatively smaller size to allow high priority transmission in the case of URLLC data arrival in its buffer. In the example shown in FIG. 2, the UE punctures two OFDM symbols for the URLLC transmission. With this intra-UE puncturing, the UE can transmit URLLC TB with extremely low latency on a dedicated resource even though the resource was granted initially for eMBB transmission. In this way, no time is spent on scheduling request and subsequent resource allocation for URLLC transmission, since existing granted resources are used to transmit the higher priority data.

However, there are some problems associated with this approach. For example, similar to downlink puncturing, it is quite challenging for the gNB to decode the data packet if no additional information is delivered to the gNB to facilitate the decoding. Following the same principle as puncturing in the downlink, a UE can convey the URLLC Signaling Indication (USI) to the network. However, the USI must be communicated differently than from downlink puncturing since in downlink puncturing the resource is fully controlled by gNB.

It is noteworthy that the USI may indicate to the network information about a specific location of where the eMBB TB is punctured. For example, the information about the location of where the eMBB TB is punctured may correspond to one or more of: a starting symbol/time; a puncturing duration and/or transmission duration; one or more subcarrier frequencies; a starting physical resource block; an amount of physical resource blocks; and/or the like. The network will likely fail to decode the eMBB TB without this knowledge, and in turn it will fail to identify the location of the URLLC TB as well. In downlink, if no puncturing indication (PI) is communicated then the BLER becomes almost 1. The results would be similar if no USI is communicated as the packet decoding without USI communication would fail also in the case of punctured uplink transmissions.

Some techniques related to intra-UE puncturing consider puncturing completely the eMBB TB namely dropping entirely the eMBB TB (PUSCH) whenever URLLC data arrives in the buffer in parallel. Instead the URLLC TB (sPUSCH: short PUSCH) is accommodated over the overlapped resource. One problem associated with this approach is that this type of allocation is highly inefficient, since the eMBB TB can be noticeably large as opposite to the a small URLLC TB, therefore such events can cause noticeable wastage of resource as the eMBB TB would need to be re-transmitted entirely again (rather than transmitting the small left over due to the limited punctured part). Other techniques consider puncturing without conveying USI, in which case neither eMBB TB nor URLLC TB can be decoded/identified as explained earlier. Other techniques consider the gNB granting the overlapped resource for both eMBB and URLLC transmission. For both eMBB and URLLC transmissions, requests are made by the UE. This type of allocation does not require USI, however, there are some performance issues with this approach. The benefit is already lost for URLLC, as it engages in grant-based signaling for latency sensitive URLLC services and on top of that, gNB allocates single overlapped resource. The corrupted or left-over part is needed to be dealt with again. For grant-free access for URLLC UE, the gNB considers identifying URLLC TB by decoding the data, which is problematic because as this is not as easy as for inter-UE in downlink direction. Yet, another approach is to prioritize an UL grant-free transmission to send high priority URLLC data (in the dedicated resource space) over a UL grant transmission—when URLLC data is in the buffer, however such an approach would lead to a waste of resources allocated to the dynamic grant and also would not be applicable when the URLLC data appears in the buffer while the UL grant transmission is being prepared/sent.

Various example embodiments provide transmission methods for exchanging USI (URLLC Signaling Indication) to support intra-UE multiplexing between lower priority traffic (such as eMBB for example) and high priority traffic (such as URLLC for example) using a puncturing operation in the UL direction. For assuring successful decoding, the USI is used to convey to the network the information about the puncturing operation and indicates where the UE is inserting a shorter TB (such as a TB belonging to URLLC for example) into the larger TB (such as a PUSCH resource originally allocated for eMBB transmission for example).

In some example embodiments, the network configures shared or dedicated resources (such as a shared grant-free resource pool or dedicated USI resource for each URLLC UE that has an eMBB allocation in the time slot for example) for USI transmission. Alternatively, the dedicated in-band resource (within the punctured resource) can be used for USI transmission. The shared resource can be flexibly configured such as in continuous slots for example. The USI may include information such as details related to the puncturing operation and/or information indicative of an identifier of the user equipment (if USI transmitted with shared resource) for example. The information for identifying the user equipment may identify the device explicitly or implicitly. For example, the information could relate to a reference signal coupled to a specific device, a C-RNTI of the device, a derivative of the C-RNTI, and/or the like.

USI Transmission Design

When utilizing puncturing, a UE can convey USI based on different types of resource allocation (such as a shared resource allocation, a dedicated resource allocation, or an in-band resource allocation for example) as discussed in more detail below.

Figure 3A:
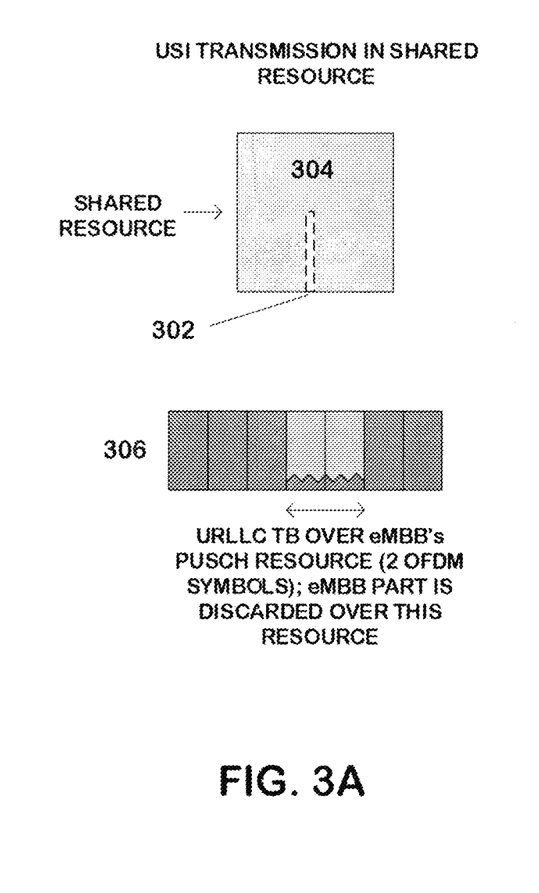
FIG. 3A shows an example of a USI transmission in a shared resource according to an example embodiment.
Figure 3B:
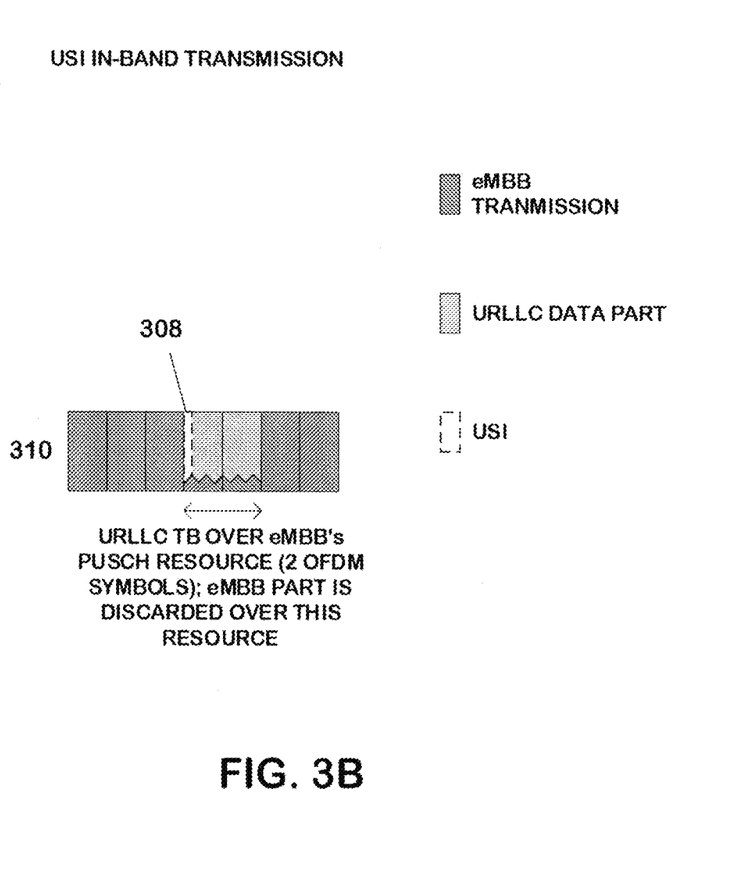
FIG. 3B shows an example of a USI in-band transmission in accordance with an example embodiment.

1. Shared resource for USI transmission: Referring now to FIG. 3A, this figure shows an example of a USI transmission 302 in a shared resource 304 according to an example embodiment. In this example, the network may allocate the shared resource 304 for USI transmission. The shared resource 304 may be flexibly configured, such as in continuous or discontinuous slots/mini-slots for example. However, when using shared resources, collisions may occur between different USIs coming from different UEs. Collisions can be resolved in different manners depending on the content of USI transmission packet. Two example options for resolving collision based on the content of USI include:
    a. Non-orthogonal USI: The USI transmission may include a UE ID (e.g., DMRS), a relative location of the first punctured symbol in eMBB resource, a number of punctured symbols, and/or other values related to the puncturing operation. Depending on the scenario, it is also possible to indicate which PRBs are punctured as discussed in more detail below. For example, in case the UE is allocated 10 PRBs in one slot, then there may be only 2 PRBs that are used for URLLC transmission. As also noted in the discussion below, MCS information for URLLC data packet may be delivered in USI as well. In the example shown in FIG. 3A the value of the relative location of the first punctured symbol is 4, and the value for the number of punctured symbols is 2 in the eMBB resource 306. Similarly, if the eMBB and URLLC have different bandwidth, information about punctured PRBs in frequency domain may be included as well. The UE ID is required to identify which UE having the granted PUSCH resource has a URLLC TB inside the eMBB resource. In case that two or more USIs collide in the same shared resource, the network cannot identify the USIs information in a straightforward manner as the USIs are non-orthogonal even though they may contain orthogonal UE IDs (based on UE-specific DMRS sequences). In this case only UE ID is detectable, and option b can be applied.
    b. Orthogonal USI: USI may include just the UE ID for example. As no location information is provided in the USI transmission packet, the network knows that the received eMBB TB has been punctured with URLLC TB, and so the network may blindly search all combinations of URLLC symbols (for example, starting position and length) possibilities in the eMBB data. Besides, if two or more UEs transmit respective USIs in the same resource and collide, the network can identify the UE IDs if the orthogonality can be kept among different DMRS sequences which is used for carrying UE ID information.
        i. As one further optimization as compared to exhaustive search, the search possibilities can be limited for example if the network pre-configures the puncturing location and length of the punctured resource.
2. Dedicated resource allocation for USI transmission: In this case, the network allocates a dedicated resource for USI transmission in addition to eMBB resource allocation. If URLLC data arrives during the eMBB transmission, then the UE can use the dedicated USI resource to deliver the USI to the network (e.g. gNB). The network may allocate this dedicated USI resources only to URLLC UEs that have an eMBB resource allocation in the time slot.
    a. In one option, the dedicated USI resources may be allocated in every mini-slot so that the eMBB resources can be punctured for transmission of URLLC data in the mini-slot right after the data arrives. In another more resource efficient option, the dedicated USI resource may be allocated only in the mini-slot that the first punctured symbol of eMBB resource is pre-configured to start (such as described below with reference to FIG. 4 for example).
    b. The dedicated USI resources may be explicitly signaled to the URLLC UE together with eMBB resource allocation. Or the dedicated USI resource may be implicitly derived from allocated eMBB resources. For the latter, the mapping from eMBB resource to dedicated USI resource may be either hard-coded (such as being defined in a wireless standard) or configured by gNB.
3. In-band resource for USI transmission: Referring now to FIG. 3B, this figure shows an example of a USI in-band transmission 308 in accordance with an example embodiment. In this example, the UE may send the USI transmission 308 along with the URLLC data packet on the allocated PUSCH resource 310 (which was originally allocated for eMBB). In other words, the USI 308 is transmitted along with the punctured resource. In this case, the network will search for the USI within the allocated eMBB resource. If no USI detected, then it means no URLLC TB is punctured. Given the eMBB TB size $T_{eMBB}$ OFDM symbols, then the maximum number of search opportunities/correlations is $T_{eMBB}$ (supposing USI can be carried with a sequence known by gNB beforehand). However, gNB can limit these correlation sequences, which means puncturing is allowed at specific locations and of specific puncturing length.

a. Transmission silence indication: Instead of correlation sequence, gNB can allow UE to stop transmission prior to punctured resource. This period of silence (such as a few microseconds for example) may indicate the beginning of URLLC TB or may be used to deliver the information that the current eMBB resource is punctured.

MCS Information Transmission

URLLC may have different BLER, and therefore may have a different modulation and coding scheme (MCS) than the ones used for eMBB transmission. In one example embodiment, the MCS information can be carried explicitly such as by including the MCS information in the USI packet.

In other example embodiments, the MCS information may be indicated implicitly, such as by using one or more of the following options for example:

Only one MCS scheme is configured for puncturing transmission. In this case, the gNB knows which MCS will be used without needing any further information.

A number of MCS schemes can be configured for puncturing transmission, as in the case of UL grant free transmission. For this option, the gNB can try to decode the URLLC TB with each of the plurality of MCS schemes. For this option, the number of MCS schemes could be limited to a specific number, namely, some number less than all possible MCS schemes.

A delta value can be preconfigured between URLLC MCS scheme and eMBB MCS scheme.

The above implicit options may be used when the USI transmission is in a shared resource or an in-band resource.

A gNB may search for the presence of a USI depending on which USI transmission option is used. According to some embodiments, the gNB may generally follow normal procedure and decode eMBB data if a USI is not detected. If a USI is detected, then the gNB may proceed to find out information about the punctured resource to help the gNB in the decoding process. If the gNB is unable to find the detailed information about the punctured resource, then the gNB may blindly (in some embodiments within the preconfigured possibilities) search the URLLC signals.

In case the USI is sent on a shared resource with the USI including just the orthogonal UE ID and carrying no further information (such as option 1b above for example), then the network may perform an exhaustive search to identify the URLLC TB in the punctured eMBB resource for the successfully identified USI. For example, in this case the maximum number of searches that the network performs for different conditions is as follows:

Assuming eMBB TB size of 7 symbols, and with URLLC TB of 1 symbol, then 7 searches are required. If URLLC TB of 2 symbols, then 6 searches are required, and so on. Hence, total number of searches is 7+6+5+4+3+2+1=28. So, if $T_{eMBB}$ is the number of symbols in eMBB TB, then number of searches required by the network to identify URLLC TB is $$\frac{T_{eMBB}(T_{eMBB}+1)}{2}.$$

However, if URLLC TB has limited maximum size (denoted as $T_{URLLC}^{max}$) then the network can use this knowledge when performing the search. For instance, where $T_{URLLC}^{max} \leq T_{eMBB}$ then the maximum number of searches required to identify URLLC TB reduces to $$\frac{T_{URLLC}^{max}(2T_{eMBB} - T_{URLLC}^{max} + 1)}{2}.$$

Further, if URLLC TB has fixed size with T URLLC symbols, then the maximum number of searches required is $T_{eMBB} - T_{URLLC} + 1$.

When the USI is sent along with URLLC data packet on the allocated PUSCH resource (such as option 3 above for example) having an eMBB TB size of $T_{eMBB}$ symbols, then the number of correlation is $T_{eMBB}$ (supposing USI can be carried with a sequence known by gNB beforehand). Further, different URLLC TB size ($T_{URLLC}$) can combinations also be included.

Figure 4:
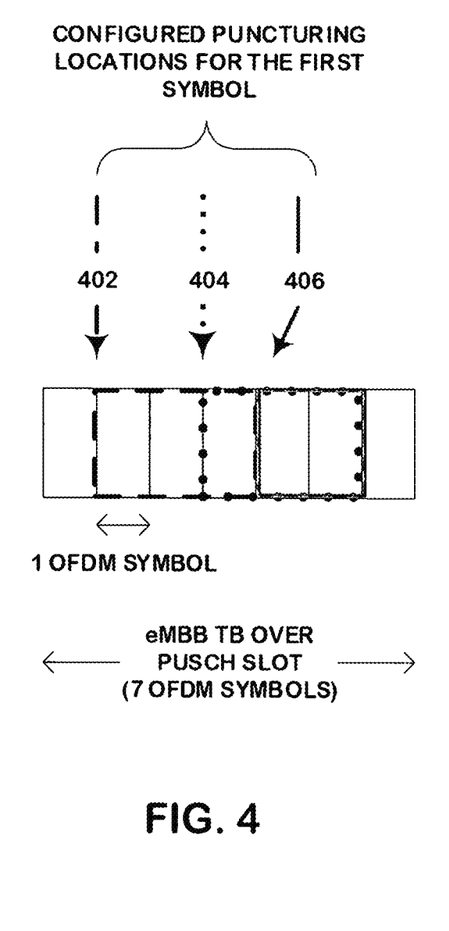
FIG. 4 shows an example of a transport block having different configured puncturing locations and lengths in accordance with an example embodiment.

In case of, for example, option 1b or option 3 above, the network may limit the search possibilities by limiting the allowed puncturing positioning in order to reduce complexity. For example, the network may limit the allowed puncturing position to every other symbol in the slot, limit the length of the punctured resource and/or the like. Referring now to FIG. 4, this figure shows a non-limiting example of where the network has limited the possibilities where the UE may puncture the resource based on the locations and lengths in accordance with an example embodiment. In this example, the eMBB TB over the PUSCH slot is 7 OFDM symbols (with symbol IDs 1 . . . 7). The gNB may limit the number of search possibilities to three by allowing puncturing as shown in the following Table 1:

TABLE 1

| First Punctured symbol (relative to first symbol in the slot with 7 symbols) | Size of punctured TB (in symbols) |
| --- | --- |
| 2 | 3 |
| 4 | 3 |
| 5 | 2 |

FIG. 4 shows each of the puncturing possibilities 402, 404, 406 corresponding to the locations and lengths within the PUSCH slot for this example. It is noted that FIG. 4 is a non-limiting example, and the network may limit the number of search possibilities to more or less than three search possibilities, and may use different locations and/or lengths than those listed in Table 1. In the example shown in FIG. 4, the search time is significantly reduces as only three search possibilities are requires as opposed to performing a full exhaustive search where 28 searches would be required for the same slot size.

According to some example embodiments, the physical (PHY) resources for USI can be kept constant with the pre-configured MCS level, or the resources can vary from UE to UE depending on the link conditions. As discussed earlier, the gNB can learn the applied MCS, such as by using pre-configured rules for example.

Figure 5:
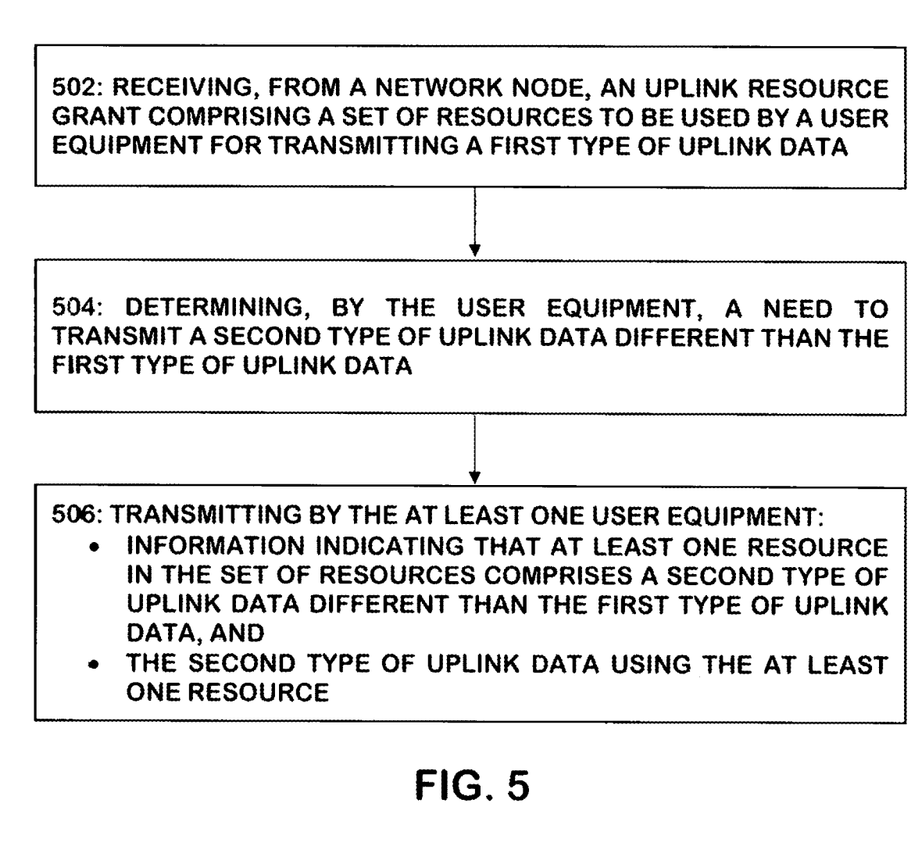
FIGS. 5 and 6 are logic flow diagrams for transmission of a signaling indication for intra-UE punctured uplink transmissions, and illustrate the operation of exemplary methods, a result of execution of computer program instructions embodied on a computer readable memory, functions performed by logic implemented in hardware, and/or interconnected means for performing functions in accordance with exemplary embodiments.

FIG. 5 is a logic flow diagram for transmission of a signaling indication for intra-UE punctured uplink transmissions. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the UL puncture module 140-1 and/or 140-2 may include multiples ones of the blocks in FIG. 5, where each included block is an interconnected means for performing the function in the block. The blocks in FIG. 5 are assumed to be performed by the UE 110, e.g., under control of the UL puncture module 140-1 and/or 140-2 at least in part.

In accordance with an example, a method may include receiving, from a network node, an uplink resource grant comprising a set of resources to be used by a user equipment for transmitting a first type of uplink data as indicated by block 502; determining, by the user equipment, a need to transmit a second type of uplink data different than the first type of uplink data as indicated by block 504, and transmitting by the at least one user equipment: information indicating that at least one resource in the set of resources comprises a second type of uplink data different than the first type of uplink data, and the second type of uplink data using the at least one resource as indicated by block 506.

The information may be indicative of at least one of: a location of the at least one resource within the set of resources; and an identifier of the user equipment. The method may further include sending the information on a shared resource allocated by the network node. The information may be indicative of only the identifier of the user equipment. The method may further include at least one of: transmitting the information on an additional resource dedicated for transmitting said information; and transmitting the information using the at least one resource in the set of resources. The information may explicitly indicate a modulation and coding scheme used for the second type of uplink data. The second type of data may be characterized by at least one of: a latency requirement that is lower than the first type of uplink data; and a reliability communication requirement that is higher than first type of uplink data.

In accordance with another example, an apparatus may include means for performing: receiving, from a network node, an uplink resource grant comprising a set of resources to be used by a user equipment for transmitting a first type of uplink data; determining, by the user equipment, a need to transmit a second type of uplink data different than the first type of uplink data, and for transmitting by the at least one user equipment: information indicating that at least one resource in the set of resources comprises a second type of uplink data different than the first type of uplink data, and the second type of uplink data using the at least one resource.

The information is indicative of at least one of: a location of the at least one resource within the set of resources; and an identifier of the user equipment. The means may be further configured to perform: sending the information on a shared resource allocated by the network node. The information is indicative of only the identifier of the user equipment. The means may be further configured to perform at least one of: transmitting the information on an additional resource dedicated for transmitting said information; transmitting the information using the at least one resource in the set of resources. The information may explicitly indicate a modulation and coding scheme used for the second type of uplink data. The second type of data may be characterized by at least one of: a latency requirement that is lower than the first type of uplink data; and a reliability communication requirement that is higher than first type of uplink data. The means may comprise at least one processor; and at least one memory including computer program code, the at least one memory and computer program code configured to, with the at least one processor, cause the performance of the apparatus.

In accordance with another example, a computer readable medium comprising program instructions stored thereon for causing an apparatus to perform at least the following: receiving, from a network node, an uplink resource grant comprising a set of resources to be used by a user equipment for transmitting a first type of uplink data; determining, by the user equipment, a need to transmit a second type of uplink data different than the first type of uplink data, and for transmitting by the at least one user equipment: information indicating that at least one resource in the set of resources comprises a second type of uplink data different than the first type of uplink data, and the second type of uplink data using the at least one resource.

The information may be indicative of at least one of: a location of the at least one resource within the set of resources; and an identifier of the user equipment. The computer instructions may be for performing: sending the information on a shared resource allocated by the network node. The information may be indicative of only the identifier of the user equipment. The computer instructions may be for performing at least one of: transmitting the information on an additional resource dedicated for transmitting said information; and transmitting the information using the at least one resource in the set of resources. The information may explicitly indicate a modulation and coding scheme used for the second type of uplink data. The second type of data may be characterized by at least one of: a latency requirement that is lower than the first type of uplink data; and a reliability communication requirement that is higher than first type of uplink data.

Figure 6:
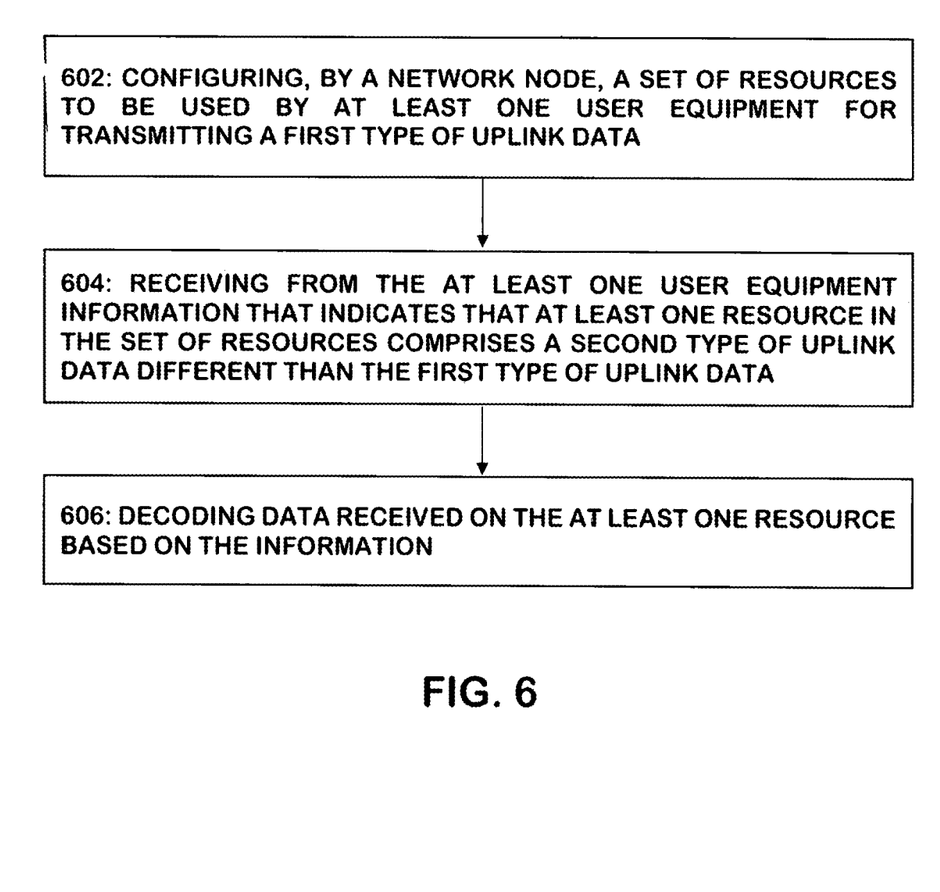

FIG. 6 is a logic flow diagram for transmission of a signaling indication for intra-UE punctured uplink transmissions. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the puncture determination module 150-1 and/or 150-2 may include multiples ones of the blocks in FIG. 6, where each included block is an interconnected means for performing the function in the block. The blocks in FIG. 6 are assumed to be performed by a base station such as gNB/eNB 170, e.g., under control of the puncture determination module 150-1 and/or 150-2 at least in part.

In accordance with one example, a method may include configuring, by a network node, a set of resources to be used by at least one user equipment for transmitting a first type of uplink data as indicated by 602; receiving from the at least one user equipment information that indicates that at least one resource in the set of resources comprises a second type of uplink data different than the first type of uplink data as indicated by 604; and decoding data received on the at least one resource based on the information as indicated by 606.

The information may be indicative of at least one of: a location of the at least one resource within the set of resources; and an identifier of the at least one user equipment. The method may include configuring a shared resource to be used by the at least one user equipment for transmitting the indication. The information may be indicative of only the identifier of the at least one user equipment and decoding the data may include: exhaustively searching the set of resources to identify the at least one resource comprising the second type of uplink data. The information may be indicative of only the identifier of the at least one user equipment and decoding the data may include: searching at least one predetermined subset within the set of resources to identify the at least one resource comprising the second type of uplink data. The method may further comprise: configuring, by the network node, an additional resource dedicated for transmitting the information by the at least one user equipment. The information may be received on the at least one resource in the set of resources. Decoding the data on the at last one resource may include determining one of a plurality of modulation and coding schemes, and the information may explicitly indicates the one modulation and coding scheme. Decoding the data received on the at last one resource may include at least one of: using a predetermined modulation and coding schemes to decode the data received on the at least one resource; attempting to decode the data received on the at least one resource using each of a predetermined number of modulation and coding schemes; and applying an offset value to an index of a modulation and coding scheme associated with the set of resources for the first data type. The second type of data may be characterized by at least one of: a latency requirement that is lower than the first type of uplink data; and a reliability communication requirement that is higher than first type of uplink data.

In accordance with another example, an apparatus may include means for performing: configuring, by a network node, a set of resources to be used by at least one user equipment for transmitting a first type of uplink data; receiving from the at least one user equipment information that indicates that at least one resource in the set of resources comprises a second type of uplink data different than the first type of uplink data; and decoding data received on the at least one resource based on the information.

The information may be indicative of at least one of: a location of the at least one resource within the set of resources; and an identifier of the at least one user equipment. The means may be further configured to perform: configuring a shared resource to be used by the at least one user equipment for transmitting the indication. The information may be indicative of only the identifier of the at least one user equipment and decoding the data may include: exhaustively searching the set of resources to identify the at least one resource comprising the second type of uplink data. The information may be indicative of only the identifier of the at least one user equipment and decoding the data may include: searching at least one predetermined subset within the set of resources to identify the at least one resource comprising the second type of uplink data. The means may be further configured to perform: configuring, by the network node, an additional resource dedicated for transmitting the information by the at least one user equipment. The information may be received on the at least one resource in the set of resources. Decoding the data on the at last one resource may include determining one of a plurality of modulation and coding schemes, and the information may explicitly indicate the one modulation and coding scheme. Decoding the data received on the at last one resource may be at least one of: using a predetermined modulation and coding schemes to decode the data received on the at least one resource; attempting to decode the data received on the at least one resource using each of a predetermined number of modulation and coding schemes; and applying an offset value to an index of a modulation and coding scheme associated with the set of resources for the first data type. The second type of data may be characterized by at least one of: a latency requirement that is lower than the first type of uplink data; and a reliability communication requirement that is higher than first type of uplink data. The means may include: at least one processor; and at least one memory including computer program code, the at least one memory and computer program code configured to, with the at least one processor, cause the performance of the apparatus.

In accordance with another example, a computer readable medium comprising program instructions stored thereon for causing an apparatus to perform at least the following: configuring, by a network node, a set of resources to be used by at least one user equipment for transmitting a first type of uplink data; receiving from the at least one user equipment information that indicates that at least one resource in the set of resources comprises a second type of uplink data different than the first type of uplink data; and decoding data received on the at least one resource based on the information.

The information may be indicative of at least one of: a location of the at least one resource within the set of resources; and an identifier of the at least one user equipment. The program instructions may be for performing: configuring a shared resource to be used by the at least one user equipment for transmitting the indication. The information may be indicative of only the identifier of the at least one user equipment and decoding the data may include: exhaustively searching the set of resources to identify the at least one resource comprising the second type of uplink data. The information may be indicative of only the identifier of the at least one user equipment and decoding the data may include: searching at least one predetermined subset within the set of resources to identify the at least one resource comprising the second type of uplink data. The program instructions may be for performing: configuring, by the network node, an additional resource dedicated for transmitting the information by the at least one user equipment. The information may be received on the at least one resource in the set of resources. Decoding the data on the at last one resource may include determining one of a plurality of modulation and coding schemes, and the information may explicitly indicates the one modulation and coding scheme. Decoding the data received on the at last one resource may include at least one of: using a predetermined modulation and coding schemes to decode the data received on the at least one resource; attempting to decode the data received on the at least one resource using each of a predetermined number of modulation and coding schemes; and applying an offset value to an index of a modulation and coding scheme associated with the set of resources for the first data type. The second type of data may be characterized by at least one of: a latency requirement that is lower than the first type of uplink data; and a reliability communication requirement that is higher than first type of uplink data.

Without in any way limiting the scope, interpretation, or application of the claims appearing below, a technical effect of one or more of the example embodiments disclosed herein is allows networks to support intra-UE puncturing of UL transmission by providing information to assure successful decoding. Another technical effect of one or more of the example embodiments disclosed herein is increasing the efficiency of the network when searching for uplink punctured transmissions. Another technical effect of one or more of the example embodiments disclosed herein is fast and reliable delivery of URLLC data packet based on a puncturing operation.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

5G 5th Generation
BLER block error ratio
eMBB enhanced Mobile Broadband
eNB (or eNodeB) evolved Node B (e.g., an LTE base station)
I/F interface
LTE long term evolution
MDS modulation and coding scheme
MME mobility management entity
NCE network control element
N/W network
PI puncturing indication
RRH remote radio head
Rx receiver
SGW serving gateway
TB transport block
Tx transmitter
UE user equipment (e.g., a wireless, typically mobile device)
UL uplink
URLLC Ultra-Reliable and Low Latency Communications
USI URLLC Signaling Indication

What is claimed is:

1. A method comprising:
    configuring, by a network node, a set of resources for use by at least one user equipment for transmitting a first type of uplink data;
    receiving, from the at least one user equipment, information indicating that at least one resource in the set of resources comprises a second type of uplink data different from the first type of uplink data; and
    decoding data received on the at least one resource based on the information.

2. The method as claimed in claim 1, wherein the information is indicative of at least one of:
    a location of the at least one resource within the set of resources; and
    an identifier of the at least one user equipment.

3. The method as claimed in claim 1, the method further comprising:
    configuring a shared resource to be used by the at least one user equipment for transmitting the indication.

4. The method as claimed in claim 3, wherein the information is indicative of only the identifier of the at least one user equipment, and
    wherein decoding the data comprises at least one of:
        exhaustively searching the set of resources to identify the at least one resource comprising the second type of uplink data; and
        searching at least one predetermined subset within the set of resources to identify the at least one resource comprising the second type of uplink data.

5. The method as claimed in claim 1, the method further comprising:
    configuring, by the network node, an additional resource dedicated for transmitting the information by the at least one user equipment.

6. The method as claimed in claim 1, wherein the information is received on the at least one resource in the set of resources.

7. The method as claimed in claim 1, wherein decoding the data on the at least one resource comprises determining one of a plurality of modulation and coding schemes, and wherein the information explicitly indicates the one modulation and coding scheme.

8. The method as claimed in claim 1, wherein decoding the data received on the at least one resource comprises at least one of:
    using a predetermined modulation and coding schemes to decode the data received on the at least one resource;
    attempting to decode the data received on the at least one resource using each of a predetermined number of modulation and coding schemes; and
    applying an offset value to an index of a modulation and coding scheme associated with the set of resources for the first data type.

9. The method as claimed in claim 1, wherein the second type of data is characterized by at least one of:
    a latency requirement lower than that of the first type of uplink data; and
    a reliability communication requirement higher than that of the first type of uplink data.

10. A non-transitory computer readable medium comprising program instructions stored thereon for causing an apparatus to perform a method as claimed in claim 1.

11. An apparatus comprising:
    at least one processor; and
    at least one non-transitory memory including computer program code, the at least one non-transitory memory and the computer program code configured, with the at least one processor, to cause the apparatus to perform at least the following:
        configuring a set of resources for use by at least one user equipment for transmitting a first type of uplink data;

receiving, from the at least one user equipment, information indicating that at least one resource in the set of resources comprises a second type of uplink data different from the first type of uplink data; and decoding data received on the at least one resource based on the information.

12. The apparatus as claimed in claim 11, wherein the information is indicative of at least one of:
a location of the at least one resource within the set of resources; and
an identifier of the at least one user equipment.

13. The apparatus as claimed in claim 11, wherein the at least one non-transitory memory and the computer program code are configured, with the at least one processor, to cause the apparatus to further perform at least the following:
configuring a shared resource to be used by the at least one user equipment for transmitting the indication.

14. The apparatus as claimed in claim 13, wherein the information is indicative of only the identifier of the at least one user equipment and wherein decoding the data comprises at least one of:
exhaustively searching the set of resources to identify the at least one resource comprising the second type of uplink data; and
searching at least one predetermined subset within the set of resources to identify the at least one resource comprising the second type of uplink data.

15. The apparatus as claimed in claim 11, wherein the at least one non-transitory memory and the computer program code are configured, with the at least one processor, to cause the apparatus to further perform at least the following:
configuring, by the network node, an additional resource dedicated for transmitting the information by the at least one user equipment.

16. The apparatus as claimed in claim 11, wherein the information is received on the at least one resource in the set of resources.

17. The apparatus as claimed in claim 11, wherein decoding the data on the at least one resource comprises determining one of a plurality of modulation and coding schemes, and wherein the information explicitly indicates the one modulation and coding scheme.

18. The apparatus as claimed in claim 11, wherein decoding the data received on the at least one resource comprises at least one of:
using a predetermined modulation and coding schemes to decode the data received on the at least one resource;
attempting to decode the data received on the at least one resource using each of a predetermined number of modulation and coding schemes; and
applying an offset value to an index of a modulation and coding scheme associated with the set of resources for the first data type.

19. The apparatus as claimed in claim 11, wherein the second type of data is characterized by at least one of:
a latency requirement lower than that of the first type of uplink data; and
a reliability communication requirement higher than that of the first type of uplink data.

20. An apparatus comprising:
at least one processor; and
at least one non-transitory memory including computer program code, the at least one non-transitory memory and the computer program code configured, with the at least one processor, to cause the apparatus to perform at least the following:
receiving, from a network node, an uplink resource grant comprising a set of resources for use by a user equipment for transmitting a first type of uplink data;
determining, by the user equipment, a need to transmit a second type of uplink data different from the first type of uplink data; and
transmitting by the at least one user equipment:
information indicating that at least one resource in the set of resources comprises a second type of uplink data different from the first type of uplink data, and the second type of uplink data using the at least one resource.

* * * * *